Patented July 26, 1949

2,477,206

UNITED STATES PATENT OFFICE 2,477,206

PROCESS FOR PURIFYING BEET JUICES

Thomas M. Rinehart, Tuckahoe, N. Y., assignor to Darco Corporation, Wilmington, Del., a corporation of Delaware No Drawing. Application November 14, 1945, Serial No. 628,663

9 Claims. (Cl. 127—50)

The present invention relates to a process for purifying juices from beets and more particularly to the purification of juices obtained from sugar beets by diffusion.

An object of the invention is to provide a more efficient and economical process for purifying beet sugar juices by means of the use of lime defecation and ion exchange operations in such a manner that a substantial saving is effected in the amount of lime employed and a reduction in the number of steps in the operation.

In the production of sugar from beets, the beets are sliced in cossettes from which the juice is extracted by diffusion into water. The thin juice resulting from the diffusion is unsuitable for direct crystallization because of the presence of large quantities of non-sugar materials, particularly colloidal matter, organic non-sugars, color bodies and ash, including a high calcium content. The colloidal matter and ash, especially the calcium salts, make it impractical to concentrate the juice, the former inducing foaming in the evaporator and the latter producing destructive scale in the evaporator. These impurities also inhibit crystallization and increase the viscosity of the concentrated liquor, thus making the separation of the crystals from the liquor difficult or impracticable. Accordingly, it is customary to purify the diffusion juice by lime defecation. In factories not employing the Steffens process the diffusion juice is defecated with lime from 1% to 3% or more by weight, based on the weight of the beets diffused. In factories using the Steffens process the quantity of lime employed is greater than that mentioned above. After the addition of the lime to the juice it is carbonated and finally the precipitate and entrained impurities are separated from the juice as by filtering. In practice the addition of lime is performed in a number of alternate ways. All of the lime can be added at once and carbonated in two successive carbonations and filtrations. Another method is to add a small portion of lime first, carbonate and then add the rest of the lime and carbonate and filter, followed by a third carbonation and filtration. A further method is to add most of the lime first, carbonate and filter and then add the remainder of the lime and carbonate and filter again. While individual non-Steffens operations have employed 1% to more than 3% of lime in this operation, the average of the industry in the 1941 campaign was 2.1% of lime by weight, based on the weight of the beets.

Lime defecation using 1% to more than 3% on weight of beets removes a large part of the colloids, raises sugar purity somewhat, improves color, and decreases the calcium content. The defecated juice has generally been passed on to the evaporators (with or without preliminary treatment with decolorizing carbon). However, the purity of the liquor is relatively low, color is frequently high and ash content is usually high enough to cause scaling in the evaporators.

To raise the purity of the defecated beet juice the art has recently employed ion exchange treatment, which is effective in removing metal salts and accomplishes some further purification of the juice. Decolorizing carbon is usually used along with the ion exchanging treatment to further improve purity and color of the juice. In operation, the juice after defecation and carbonation in the usual manner, is passed through an ion exchanging system.

The ion exchanging treatment accomplishes a definite improvement in the juice but adds a considerable element of expense to the process.

It has now been found that, in accordance with the present invention, the combination of lime defecation and ion exchange treatment can be conducted in a greatly simplified and more economical manner. The conventional lime defecation involves the use of 1 to 3% or more of lime with generally two or more carbonations and filtrations as described above. The use of this amount of lime results in the production of a voluminous precipitate which requires large filtering capacity and frequent interruption to operation while filters are sweetened off and cleaned. The use of smaller quantities of lime has not been practicable heretofore because the quality of the juices so-treated was so low, lime salts and colloids being especially high, that difficulty was experienced in evaporation and crystallization. According to the present invention, however, the lime defecation is conducted by using only a small quantity of lime. The impurities precipitated by the lime are then separated from the juice by any convenient means, such as, filtration, with or without the addition of filter aid, carbonation to obtain a more filterable precipitate followed by filtration, or by thickening methods. The amount of lime used in the invention is from 0.1% to 0.75% and preferably about 0.25% by weight, based on the weight of beets diffused. The lime is preferably added all at once followed by the separation step. In addition to the primary saving in the amount of lime used, which is very considerable, the new process makes it possible to eliminate the whole operation of successive carbonation and filtration.

It also effects a very substantial reduction in the quantity of precipitate to be separated. As a result of reducing the volume of lime precipitate, a saving in sugar is made.

In operating according to the invention the sugar juice obtained from beets in any convenient manner, as by diffusion or by pressing, is defecated by the addition of from 0.1% to 0.75% of lime by weight based on the weight of beets processed. This quantity of lime is added preferably at once, and is suitably added as a slurry or milk in water. The juice may be either hot or cold at the time the lime is added. In the event that the juice is cold at the time of the addition of the lime, it is thereafter heated and the precipitate separated while hot. The temperature in this step may be at any desired value and may be as high as the boiling point.

Preferably the removal of lime precipitate is performed by carbonation and filtration. However, as stated above, other methods of separation, such as simple filtration, are very effective. The addition of filter aid will, under some circumstances, be found desirable in filtering either carbonated juice or juice which has not been carbonated. The extent to which carbonation is carried is subject to considerable variation. pH values as high as about 10 and as low as about 8 will be found satisfactory to produce usable juices. It is generally preferred, however, that the carbonation be carried to a point such that a pH between about 8.4 and about 9.5 is obtained. The pH values mentioned through-out this specification refer to determinations made on the juice after cooling to room temperature.

Following the defecation, the juice is cooled, preferably to 20° C. or lower, and passed through the ion exchanging system. The effluent from the ion exchangers can be used at one in the usual concentrating and crystallizing operations, after making any required pH adjustment.

While the defecating operation can be performed with a quantity of lime within the range stated above, namely, 0.1–0.75% by weight based on the weight of beets, it is preferred to use a quantity of about 0.25% by weight. The optimum quantity will be indicated at somewhat different values within the range depending on the quality of the sugar juice being treated. Thus a high quality juice will require less lime than one of poor quality, as will be understood by the workers in this art.

In the purification after defecation the ion exchanging materials can be used alone, but to produce the best quality juice it is sometimes desirable to employ a decolorizing carbon in conjunction with the ion exchanging system.

The ion exchanging treatment can be performed by passing the defecated juice through a tower of granular cation exchanging material operating in a hydrogen cycle. It is desirable to keep the temperature of the juice at 20° C. or lower to minimize inversion losses (since the pH of the cation exchanger effluent is quite low) and also to prevent injury to the exchanger. As a result of this treatment the calcium and other metal ions of the juice are replaced with hydrogen and an improvement in purity and colloids content of the juice is noted.

When decolorizing carbon is employed in the process, it is generally preferred that the juice be passed through a bed of this material following its treatment in the cation exchanger. Decolorizing carbon is somewhat more efficient at low pH and the location after the cation exchanger insures this desirable pH condition.

After cation exchanging treatment and decolorizing carbon treatment if it be used, the juice must be neutralized before evaporation. The preferable neutralization consists in passing the acid juice through an anion exchanger which removes the acid anions (or the whole acid molecules) and leaves a virtually ash-free juice. In place of anion exchange the juice can be neutralized by the addition of an alkaline material like soda ash which does not introduce ions such as calcium, which cause scaling in the evaporator. Other neutralizing agents are the other alkali metal carbonates, caustic alkalis, ammonium hydroxide, etc.

The details of a method of operating a typical exchanging-decolorizing carbon system employing both cation and anion exchangers are described in the periodical "Sugar," for January, 1943, on pages 26 to 31. The juice is run through the system until the quality of the effluent shows the system is nearing exhaustion. Thereupon the system is washed with water to recover sugar values and regenerated in the conventional manner. The decolorizing carbon can also be regenerated in this operation. The cation exchanging bed is regenerated by treatment with an acid and the anion exchanging bed and carbon are both regenerated by treatment with an alkali.

The materials used in the ion exchangers comprise a large class of compounds which are well-recognized in the art. Preferable exchangers are the recently developed organic ion exchangers, either of the so-called "carbonaceous" or "synthetic resin" types. Organic cation exchangers of the synthetic resin or carbonaceous types are preferred to the older inorganic types for operation in the hydrogen cycle because their structural form withstands repeated acid regeneration more satisfactorily. The cation exchangers in general have acid groups in which the hydrogen can be replaced by metal ions taken up from the solutions being treated. A typical synthetic resinous cation exchanger is a sulfonated phenol-formaldehyde resin. Another useful cation exchanger is a carbonaceous zeolite, such as sulfonated coal, peat or wood. The cation exchangers become exhausted through the replacement of all the readily available hydrogen ions with metal ions. At this point the effluent fails to show the reduction in pH which normally occurs in the passage of a salt-containing solution through the cation exchanger. The ion exchanging process is thereupon reversed by passing an acid through the beds to replace the metal ions with hydrogen ions. The use and regeneration of the materials can go on indefinitely as long as the physical structure of the ion exchanging material is not destroyed.

The anion exchangers are generally synthetic resins which contain basic groups such as amino, quaternary ammonium or other nitrogen base groups, capable either of adsorbing the anion of an acid or a whole acid molecule. In the case where the anion alone is adsorbed, the anion exchanger gives up a hydroxyl ion in exchange. Where the anion exchanger operates by adsorbing the whole acid molecule it does not involve a true "exchange" but the action is generally referred to as ion exchange and the term as used herein is intended to include regenerable materials of this type. When the effluent from the anion exchanger fails to show the proper high pH value indicative of the operation, it is approaching exhaustion and it is thereupon regenerated by treatment with an alkali solution which either removes the acid molecules previously adsorbed or else exchanges hydroxyl ions for acid anions depending on the way in which the ion exchanger operates.

A discussion of a variety of known synthetic resin and carbonaceous ion exchangers is to be found in the book entitled "Advances in Colloid Science," edited by E. O. Kraemer, published by Interscience Publishers, Inc., New York city, 1942, in an article by R. J. Myers at pages 317 to 351 of volume I.

The present invention is not limited to the use of any particular ion exchanger but includes ion exchangers as a broad class. Considerations of cost, efficiency, ease of regeneration, and availability will dictate a preference for one or another of the numerous known ion exchangers in a particular case.

In the examples, samples of juices were prepared by diffusion from beet cossettes into water. Analytical figures expressed in the examples represent the following:

Concentration = °Bx by spindle.
Purity = Apparent purity.
$$= \frac{\text{Percent sucrose by direct polarization}}{°\text{Bx by spindle}} \times 100$$
Dye value = Mg. Night Blue to flocculate colloids in 100 g. solids.
Ash = Percent by weight on solids (100° Bx.).
Lime salts = Percent by weight on solids (100° Bx.).
Color = Modified Meade-Harris Green color units per 100° Bx. in 20 mm. cell.

EXAMPLE I

A diffusion juice with the following analytical values:

Concentration = 10.9° Bx.
Purity = 86.9
Dye value = 1750
Color = opaque
Lime salts = 0.328% was defecated by heating to 70° C. and adding 0.25% lime by weight of the beets represented in the juice sample. The lime was added slowly in the form of a milk containing 18.5 g. CaO per 100 ml. After the addition of all the lime the mixture was heated to 85° C. and $CO_2$ bubbled into the mixture until the pH was reduced to 8.9. At this point the mixture was filtered. The filtrate was found to have the following values:

Concentration = 11.15° Bx.
Purity = 90.4
Dye value = 512
Color = 393
Ash = 3.44%
Lime salts = 0.268%

This juice "as is" would not be suitable for further processing due particularly to the high lime salt and high colloid content. The lime salts would precipitate on concentrating the juice in the evaporator and the colloids would interfere with crystallization.

The filtered juice from the above test was then cooled to 20° C. and passed through a freshly regenerated system composed of a tower of granular cation exchanging synthetic resin ("Catex" sold by International Filter Co.), a tower of granular decolorizing carbon ("Darco" sold by Darco Corp.), and a tower of granular anion exchanging synthetic resin ("Anex" sold by International Filter Co.). An amount of the filtrate was treated equal to 6⅔ times the volume of each of the ion exchangers and the effluent was found to have the following values:

Concentration = 9.61° Bx.
Purity = 96.0
Dye value = 128
Color = 0.0
Ash = 0.31%
Lime salts = 0.014% b

For comparison with the foregoing, a sample of diffusion juice which had the following values:

Concentration = 10.75° Bx.
Purity = 89.3
Dye value = 2180
Lime salts = 0.342% was filtered without liming and, after cooling to 20° C., the filtrate was passed through the same ion exchanger-decolorizing carbon system which had been freshly renegerated. The effluent showed good purity and low ash content but was so high in colloids that it could not be evaporated beyond 19.2° Bx. due to excessive foaming. The color of the effluent was also quite high.

It can readily be seen from a comparison of the above, first, that low lime defecation alone and, second, that ion exchanger-decolorizing carbon treatment alone, do not produce usable sugar liquors while the combination of a low lime defecation and ion exchanger-decolorizing carbon treatment produces high quality sugar liquors.

EXAMPLE II

A beet diffusion juice of the following characteristics:

Concentration = 10.7° Bx.
Purity = 88.6
Dye value = 1460
Lime salts = 0.355 was heated to 70° C. and defecated by the addition of 0.1% lime (as milk containing 18.5 g. CaO per 100 ml.) by weight based on the weight of the beets represented in the juice sample. The mixture was heated as in Example I, carbonated to pH 8.4 and filtered. The filtrate had the values:

Concentration = 11.3° Bx.
Purity = 88.7
Color = 943
Dye value = 1170
Ash = 3.57%
Lime salts = 0.327%

After cooling to 20° C. the filtrate was passed through a freshly regenerated ion exchanger-decolorizing carbon system as in Example I. Five volumes of the filtrate were treated (based on the ion exchanger volumes) and the effluent had the values:

Concentration = 8.3° Bx.
Purity = 96.4
Color = 131
Ash = 0.083%
Lime salts = 0.026%

This liquor was concentrated without difficulty to 55.2° Bx. The dye value of the concentrate was found to be 178 and color 123 with purity unchanged at 96.4.

b

For comparison with the process of this invention, a sample of diffusion beet juice with the values:

Concentration = 10.4° Bx.
Purity = 87.2
Dye value = 1550 was heated to 70° C. and limed with 2.1% of lime (as milk of lime) by weight based on the weight of beets represented in the sample. The mixture was heated and carbonated until the precipitate showed a definite tendency to flock and settle (to "break"), then filtered and the filtrate carbonated to pH 8.9 and filtered a second time. At this point the liquor had the values:

Concentration=10.5° Bx.
Purity=90.4
Dye value=110
Color=247
Ash=3.11%
Lime salts=0.130%

Liquor treated in this way is generally used without further purification in beet sugar refining. In this example, however, the liquor was then passed through the freshly regenerated ion exchanger-decolorizing carbon system described. After 5 volumes of liquor (based on the ion exchanger volumes) had been treated, a composite sample had the values:

Concentration=7.8° Bx.
Purity=96
Color=0.0
Ash=0.05%
Lime salts=0.015%

On evaporation of this material to 49.6° Bx., the purity was found to be 97.3, dye value 10 and color 11.

EXAMPLE III

A beet diffusion juice was obtained having the characteristics shown in the first column of Table I, below. A portion of this juice was defecated by the addition of 0.40% of lime, based on weight of beets and in the form of a milk containing 20.0 grams of lime per 100 mls., to the juice at 35° C. and heating to 80° C. To the heated limed juice was added 0.30%, based on weight of beets, of filter aid ("Dicalite Speedplus," manufactured by Dicalite Company), and the juice was filtered. The properties of the juice so obtained are shown in the second column of Table I, below.

One portion of the filtrate was treated with milk of lime to provide an additional 0.25% of lime, heated to 80° C. and carbonated to a pH of about 9. The properties of this juice after filtration are shown in the third column of Table I.

A second portion of the juice, limed and filtered with filter aid, was cooled to 20° C. and passed through an ion exchange system comprising a column of cation exchange material ("Zeokarb H" manufactured by Pemutit Company) and a column containing an equal volume of acid absorbing material ("Deacidite" manufactured by Pemutit Company). Each of the elements of the ion exchange system had been regenerated before use according to the manufacturer's instructions. A volume of juice corresponding to six times the bed volume of either exchanger was treated and the resultant juice qualities are shown on the fourth column of Table I.

TABLE I

|  | Diffusion Juice | Defecated with 0.40% CaO | Defecated with 0.40% CaO, then 0.25% CaO and Carbonated | Defecated with 0.40% CaO and Ion Exchanged |
|---|---|---|---|---|
| Concentration | 11.4 | 11.3 | 12.7 | 9.8 |
| Purity | 89.0 | 90.3 | 91.4 | 96.3 |
| Dye Value | 2,960 | 362 | 360 | (1) |
| Color | opaque | 109 | 258 | 0.0 |
| Ash | | 5.73 | 3.81 | 0.58 |
| Lime Salts | | 0.92 | 0.08 | 0.014 |

1 Less than could be determined at this concentration.

In commercial practice diffusion juice defecated employing small quantities of lime has not been found satisfactory due to high lime salts content, high colloids and high color. The present process provides means for producing juices of quality well within the lime salts, colloid and color range of usefulness, and, furthermore, the juices have high purities with negligible ash content.

The following tabulation of the data from the examples presents the comparison of the juices as they would be sent to the evaporators after the preliminary treatments specified:

TABLE II

Treatment

|  | 2.1% lime+2 carbonations and filtrations | | 0.25% lime+1 carbonation and filtration | | 0.1% lime+1 carbonation and filtration | | 0.4% lime and filtration | |
|---|---|---|---|---|---|---|---|---|
|  | No ion exchange | ion exchange | No ion exchange | ion exchange | No ion exchange | ion exchange | No ion exchange | ion exchange |
| Purity | 90.4 | 96.0 | 90.4 | 96.0 | 88.7 | 96.4 | 90.3 | 96.3 |
| Dye Value | 110 | 10 | 512 | 128 | 1,170 | 1 178 | 362 | (2) |
| Color | 247 | 0.0 | 393 | 0.0 | 943 | 131 | 109 | 0.0 |
| Ash Content | 3.11 | 0.05 | 3.44 | 0.31 | 3.57 | 0.083 | 5.73 | 0.58 |
| Lime Salts | 0.130 | 0.015 | 0.263 | 0.014 | 0.327 | 0.026 | 0.92 | 0.014 |

1 Value after evaporation to 55.2° Bx.
2 Less than could be determined at concentration employed.

The high efficiency of the process of the invention is illustrated in this tabulation. The purity, ash, and lime salts content of the juices treated according to the invention with one liming using one-fifth to one-twentieth of the usual amount of lime followed by separation and ion exchange treatment are essentially as good as the corresponding values of juice defecated by conventional heavy liming and double carbonation treatment followed by ion exchange treatment, and the color and colloids content are well within the useful range.

The invention is not limited to the details of the process described above except as restricted by the following claims. Many variations of the process will be apparent to those skilled in the art.

This application is a continuation in part of co-pending application Serial Number 480,679, filed March 26, 1943, now abandoned.

What is claimed is:

1. A process for purifying sugar juices obtained from beets which comprises adding to the juices a total quantity of lime in the range of about 0.10 to about 0.75% by weight, based on the weight of beets, separating insoluble matter from the treated juices, passing the separated solution through a cation exchanger operating in hydrogen cycle, and neutralizing the effluent from the cation exchanger.

2. A process for purifying sugar juices obtained from beets which comprises adding to the juices a total quantity of lime in the range of about 0.10 to about 0.75% by weight, based on the weight of beets, separating insoluble matter from the treated juices, passing the separated solution through a cation exchanger operating in hydrogen cycle, and neutralizing the effluent from the cation exchanger by passing said effluent through an anion exchanger.

3. A process for purifying sugar juices obtained from beets which comprises adding to the juices a total quantity of lime in the range of about 0.10 to about 0.75% by weight, based on the weight of beets, adding filter aid to the treated juices, filtering the insoluble material and the filter aid from the treated juices, passing the filtrate through a cation exchanger operating in hydrogen cycle, and neutralizing the effluent from the cation exchanger by passing said effluent through an anion exchanger.

4. A process for purifying sugar juices obtained from beets which comprises adding to the juices a total quantity of lime in the range of about 0.10 to about 0.75% by weight, based on the weight of the beets, carbonating the limed juices until a pH between about 8 and about 10 is reached, separating the precipitated material from the juice, and passing the separated juice through a cation exchanger operating in hydrogen cycle, and thereafter through an anion exchanger.

5. A process for purifying sugar juices obtained from beets which comprises adding to the juices a total quantity of lime in the range of about 0.1 to about 0.75% by weight, based on the weight of beets, carbonating the limed juice until a pH between about 8 and about 10 is reached, filtering the carbonated juice, passing the filtrate through a cation exchanger operating in hydrogen cycle, and neutralizing by passing said effluent through an anion exchanger.

6. A process for purifying sugar juices obtained from beets which comprises adding to the juices a total quantity of lime in the range of about 0.10 to about 0.75% by weight, based on the weight of beets, carbonating the limed juices until a pH between about 8 and about 10 is reached, filtering the carbonated juices, passing the filtrate through a cation exchanger operating in hydrogen cycle, and neutralizing the effluent from the cation exchanger.

7. A process for purifying sugar juices obtained from beets which comprises adding to the juices a total quantity of about 0.25% of lime by weight, based on the weight of beets, carbonating the limed juices until a pH between about 8.4 and about 9.5 is reached, filtering the carbonated juice to remove the precipitate therefrom and passing the filtrate through a cation exchanger operating in hydrogen cycle and thereafter through an anion exchanger.

8. A process for purifying sugar juices obtained from beets which comprises adding to the juices a total quantity of lime in the range of about 0.10 to about 0.75% by weight, based on the weight of beets, carbonating the limed juices until a pH between about 8 and about 10 is reached, filtering the carbonated juices to remove the precipitate therefrom and passing the filtrate consecutively through a bed of cation exchanging material, a bed of decolorizing carbon and a bed of anion exchanging material.

9. A process for purifying sugar juices obtained from beets which comprises adding to the juices a total quantity of about 0.25% of lime by weight, based on the weight of beets, carbonating the limed juices until a pH between about 8.4 and about 9.5 is reached, filtering the carbonated juices to remove the precipitate therefrom and passing the filtrate consecutively through a bed of cation exchanging material, a bed of decolorizing carbon, and a bed of anion exchanging material.

THOMAS M. RINEHART.

REFERENCES CITED

The following references are of record in the file of this patent:

UNITED STATES PATENTS

| Number | Name | Date |
|---|---|---|
| 2,164,186 | Brown | June 26, 1939 |
| 2,340,128 | Kent | Jan. 25, 1944 |
| 2,388,194 | Vallez | Oct. 30, 1945 |
| 2,388,195 | Vallez | Oct. 30, 1945 |